United States Patent
Koshy et al.

(10) Patent No.: US 11,576,111 B2
(45) Date of Patent: *Feb. 7, 2023

(54) PREDICTIVE SCANNING AND HANDOVER (71) Applicant: Dell Products, L.P., Round Rock, TX (US)

(72) Inventors: Kamal Joseph Koshy, Austin, TX (US); Vivek Viswanathan Iyer, Austin, TX (US); Minho Cheong, Round Rock, TX (US); Dileep Kumar Soma, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 7 days.

This patent is subject to a terminal disclaimer.

(21) Appl. No.: 17/175,980

(22) Filed: Feb. 15, 2021

(65) Prior Publication Data
US 2021/0235369 A1    Jul. 29, 2021

Related U.S. Application Data

(63) Continuation of application No. 16/774,590, filed on Jan. 28, 2020, now Pat. No. 10,939,367.

(51) Int. Cl.
*H04W 48/16* (2009.01)
*H04W 64/00* (2009.01)
*H04W 4/029* (2018.01)
*H04W 88/06* (2009.01)
*H04W 4/02* (2018.01)
*H04W 8/00* (2009.01)

(52) U.S. Cl.
CPC .......... *H04W 48/16* (2013.01); *H04W 4/023* (2013.01); *H04W 4/029* (2018.02); *H04W 8/005* (2013.01); *H04W 64/003* (2013.01); *H04W 88/06* (2013.01)

(58) Field of Classification Search
CPC ..... H04W 48/16; H04W 4/029; H04W 8/005; H04W 64/003; H04W 88/06
USPC ...... 455/434, 436, 442, 422.1, 432.1, 435.1; 370/331
See application file for complete search history.

(56) References Cited

U.S. PATENT DOCUMENTS

| 5,471,660 | A  | * | 11/1995 | Masaki | ................ | H04B 15/04 455/296 |
| 6,721,572 | B1 |   | 4/2004  | Smith et al. | | |
| 10,939,367 | B1 | * | 3/2021  | Koshy | .................. | H04W 48/16 |

(Continued)

OTHER PUBLICATIONS

Z. Weng, et al., "Classification of Wireless Interference on 2.4GHz Spectrum," TR2014-018, Apr. 2014, 8 pages, Mitsubishi Electric Research Laboratories, Inc., Cambridge, Massachusetts, USA.

*Primary Examiner* — Nghi H Ly
(74) *Attorney, Agent, or Firm* — Fogarty LLP (57) ABSTRACT

Systems and methods for predictive scanning and handover are described. In some embodiments, an Information Handling System (IHS) may include a processor and a memory coupled to the processor, the memory having program instructions stored thereon that, upon execution, cause the IHS to: receive context information; predict a loss of a first wireless connection based upon the context information; in response to the prediction, start scanning for a second wireless connection while maintaining the first wireless connection; and switch to the second wireless connection prior to losing the first wireless connection.

20 Claims, 5 Drawing Sheets

(56) References Cited

U.S. PATENT DOCUMENTS

| | | |
|---|---|---|
| 2005/0272427 A1 | 12/2005 | Benco et al. |
| 2006/0146748 A1* | 7/2006 | Ng .................... H04W 60/005 370/349 |
| 2010/0323704 A1 | 12/2010 | Tailor et al. |
| 2014/0173679 A1 | 6/2014 | Kimura et al. |
| 2014/0349675 A1 | 11/2014 | Schatzberg et al. |
| 2015/0098678 A1* | 4/2015 | Miglani ............... G02B 6/3512 385/17 |
| 2019/0014024 A1 | 1/2019 | Koshy |
| 2019/0245810 A1 | 8/2019 | Gulbay et al. |

* cited by examiner

PREDICTIVE SCANNING AND HANDOVER

CROSS-REFERENCE TO RELATED APPLICATIONS

This specification claims the benefit of the filing date of U.S. patent application Ser. No. 16/774,590, which is titled "PREDICTIVE SCANNING AND HANDOVER" and was filed on Jan. 28, 2020 the disclosure of which is hereby incorporated by reference herein in its entirety.

FIELD

This disclosure relates generally to Information Handling Systems (IHSs), and more specifically, to systems and methods for predictive scanning and handover.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs often communicate through networks to perform processing tasks. Generally, client IHSs establish communication through a network to a server IHS to retrieve and store information. Different types of networks support different types of communication at different data transfer rates. For example, a conventional client IHS may communicate with a local area network (LAN) through a wired Ethernet communication, such as through a CAT 5 cable, through a USB or other serial cable, or through a variety of wireless communication protocols, such as a wireless local area network (WLAN) or a wireless wide area network (WWAN). In an enterprise or residential network, client IHSs access networks through access points, such as with wireless or Ethernet interfaces (e.g., an Internet router interface).

Typically, applications executing on a client IHS use a single network interface to communicate with external networks. For example, an Internet browser executing on a client IHS establishes a network interface through a WLAN and uses the WLAN for communication with the network. Although other types of network interfaces are available, such as an Ethernet LAN interface or a WWAN interface, the application relies upon only one network interface to communicate with an external network.

Other applications may support multiple network interfaces. In those cases, network traffic is divided by application so that a selected application, such as a game that uses network communication, has all of the bandwidth of one network interface available, such as an Ethernet interface, while other applications share a separate network interface, such as a WLAN. These applications effectively increase network bandwidth at a client IHS by allowing simultaneous connections over multiple links.

As the inventors hereof have recognized, in the case of an IHS having two or more wireless interfaces (e.g., WiFi and cellular), it is important to enable seamless handover between them. However, conventional scanning and handover methods between wireless interfaces can take up to 10 seconds or more, often lead to disconnections, etc. To address these, and other problems, the inventors have developed systems and methods for predictive scanning and handover to reduce or eliminate the interval of disconnection.

SUMMARY

Embodiments of systems and methods for predictive scanning and handover are described. In an illustrative, non-limiting embodiment an Information Handling System (IHS) may include a processor and a memory coupled to the processor, the memory having program instructions stored thereon that, upon execution, cause the IHS to: receive context information; predict a loss of a first wireless connection based upon the context information; in response to the prediction, start scanning for a second wireless connection while maintaining the first wireless connection; and switch to the second wireless connection prior to losing the first wireless connection.

In some cases, the IHS may include a mobile device. The first wireless connection may be a WiFi connection, and the second wireless connection may be a cellular connection. The context information may include a Received Signal Strength Indicator (RSSI). Additionally, or alternatively, the context information may include a Time-of-Flight (ToF) indicator.

To predict the loss, the program instructions, upon execution, may cause the IHS to determine that the IHS is moving toward a dead zone with respect to the first wireless connection using the context information. To determine that the IHS is moving toward the dead zone, the program instructions, upon execution, may cause the IHS to compare a current behavior of a user of the IHS with a historical behavior of the user. To predict the loss of the first wireless connection, the program instructions, upon execution, may then cause the IHS to determine that the IHS is within a threshold distance or time from the dead zone based upon the comparison.

In some cases, the context information may include an application under execution, and the threshold distance or time may be selected as a first threshold distance or time in response to the application being a first application or a second threshold distance or time in response to the application being a second application. Additionally, or alternatively, the context information may include an IHS posture, and the threshold distance or time may be selected as a first threshold distance or time in response to the IHS posture being a first posture or a second threshold distance or time in response to the IHS posture being a second posture. Additionally, or alternatively, the context information may include an indication of whether the IHS is inside or outside of a bag, and the threshold distance or time may be selected as a first threshold distance or time in response to the IHS being inside the bag or a second threshold distance or time in response to the IHS being outside the bag.

The program instructions, upon execution, may also cause the IHS to: receive additional context information; predict a detection of the first wireless connection based upon the additional context information; in response to the prediction, start to scan for the first wireless connection while maintaining the second wireless connection; and switch to the first wireless connection prior to dropping the second wireless connection.

To predict the detection of the first wireless connection, the program instructions, upon execution, may cause the IHS to determine that the IHS is moving toward a live zone with respect to the first wireless connection using the additional context information. To determine that the IHS is moving toward the live zone, the program instructions, upon execution, may cause the IHS to compare the current behavior of a user of the IHS with the historical behavior of the user. Then, to predict the detection of the first wireless connection, the program instructions, upon execution, may cause the IHS to determine that the IHS is within another threshold distance or time from the live zone based upon the comparison.

The additional context information may another application under execution, and the program instructions, upon execution, may cause the IHS to select a first threshold distance or time in response to the other application being a first application or a second threshold distance or time in response to the other application being a second application. Additionally, or alternatively, the additional context information may include an IHS posture, and the program instructions, upon execution, may cause the IHS to select a first threshold distance or time in response to the IHS posture being a first posture or a second threshold distance or time in response to the IHS posture being a second posture. Additionally, or alternatively, the additional context information may include an indication of whether the IHS is inside or outside of a bag, and the program instructions, upon execution, may cause the IHS to select a first threshold distance or time in response to the IHS being inside the bag or a second threshold distance or time in response to the IHS being outside the bag.

In another illustrative, non-limiting embodiment, a memory device may have program instructions stored thereon that, upon execution by an IHS, cause the IHS to: receive context information; predict a loss of a first wireless connection based upon the context information; and in response to the prediction, start to scan for a second wireless connection.

In yet another illustrative, non-limiting embodiment, a method may include receiving context information, predicting a loss of a first wireless connection based upon the context information, and in response to the prediction, starting to scan for a second wireless connection.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Systems and methods for predictive scanning and handover are described. Conventionally, scanning for cellular networks is performed only in response to a current WiFi connection being lost (e.g., WiFi scanning is triggered upon the loss of a cellular connection, whereas a cellular network scan is triggered when WiFi is not available). In contrast, in various embodiments described herein, systems and methods may predict an eventual drop in an Information Handling System's (IHS') first wireless connection (e.g., WiFi) and may start scanning for a second wireless connection (e.g., LTE/5G/cellular) before the first connection is dropped using parameters such as a Time-of-Flight (ToF) indicator, a Received Signal Strength Indicator (RSSI), and/or a history of prior handover operations or IHS/user behavior, taking into account context information. A similar method to predict the handover from cellular to WiFi may also be implemented to reduce frequent WiFi scans and save power, using different parameters.

In some cases, these systems and methods may be implemented, in part, as a software service executed by a processor, embedded controller (EC) or Integrated Sensor Hub (ISH) that receives the contextual information (e.g., IHS posture, hinge angle, standby state, application in execution, bag state, etc.), motion input, and/or other wireless parameters, and performs predictive scanning and handover operations based upon such information. For example, systems and methods described herein may employ predictive wireless scanning when an IHS is within a certain range of RSSI/ToF signature values, before a present connection is lost. Additionally, or alternatively, predictive handover techniques may be performed when an IHS is determined to be in a dead zone and moving to a live zone.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
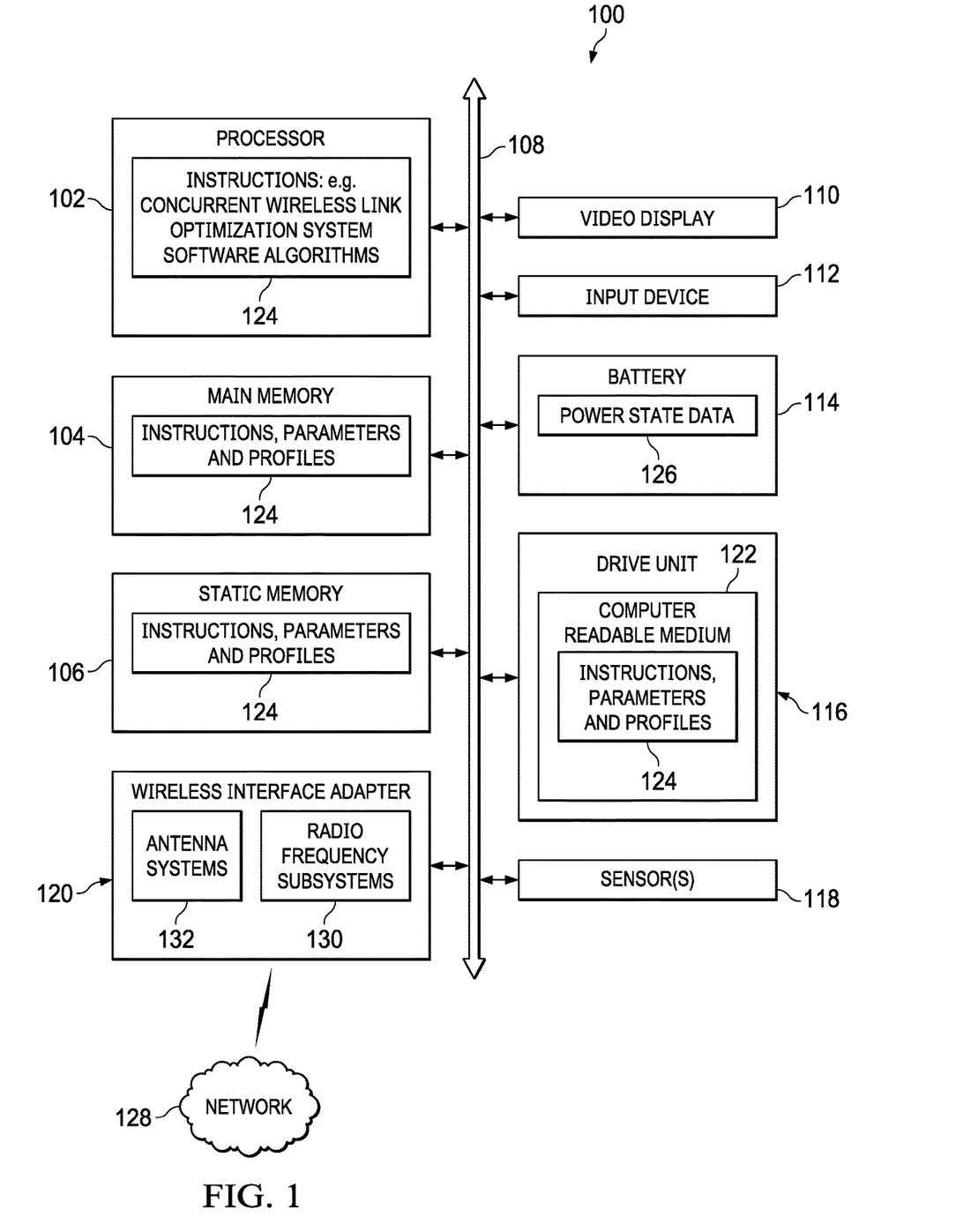
FIG. 1 is block diagram of an example of components of an Information Handling System (IHS) configured to implement predictive scanning and handover, according to some embodiments.

FIG. 1 is block diagram of an example of components of an Information Handling System (IHS) configured to implement predictive scanning and handover. In some embodiments IHS 100 may represent wireless communication devices 210, 220, and 230 or servers or systems 290 located anywhere within network 200 of FIG. 2, including remote data center 286.

Generally speaking, IHS 100 may represent a wireless communication device (e.g., a phone, a tablet, a watch, a laptop, etc.) associated with a user or recipient of intended wireless communication. A wireless communication device may execute instructions via a processor for a context aware radio resource management system including a predictive scanning and handover system. The context aware radio resource management system or the predictive scanning and handover system may operate as a software agent, in whole or in part, on a wireless communication device. IHS 100 may also represent a networked server or other system and administer aspects of the context aware radio resource management system including a predictive scanning and handover system via instructions executed on a processor.

As shown in FIG. 1, IHS 100 may include processor 102 such as a central processing unit (CPU), a graphics processing unit (GPU), or both. Moreover, IHS 100 can include main memory 104 and a static memory 106 that can communicate with each other via bus 108. As shown, IHS 100 may further include video display unit 110, such as a liquid crystal display (LCD), an organic light emitting diode (OLED), a flat panel display, a solid-state display, or other type of display system. Display 110 may include a touch screen display module and touch screen controller (not shown) for receiving user inputs to IHS 100. In some implementations, two displays may be coupled to each other via a hinge or the like.

Additionally, IHS 100 may include input device 112, such as a keyboard, and a cursor control device, such as a mouse or touchpad or similar peripheral input device. IHS 100 may also include a power source such battery 114 or an NC power source. IHS 100 may also include disk drive unit 116 and sensor(s) 118. IHS 100 may include a network interface device such as wireless adapter 120. IHS 100 may also represent a server device whose resources can be shared by multiple client devices, or it can represent an individual client device, such as a desktop personal computer, a laptop computer, a tablet computer, or a mobile smartphone.

IHS 100 may include program instructions 124 that can be executed by processor 102 to cause the computer system to perform any one or more of the methods or operations disclosed herein. For example, instructions 124 may execute a predictive scanning and handover algorithm among a plurality of local area networks/communication links, including concurrent wireless access between local area network components or clients, software agents, or other aspects or components. Similarly, instructions 124 may establish aggregated multiple wireless links and resources within local area network access points and client.

In some cases, instructions 124 may be executed for performing predictive scanning and handover among one or more wireless communication bands or other communication links such as WLAN, WiGig, Ethernet or the like. Additionally, or alternatively, instructions 124 may be executed for regulating aggregated transmission or reception along wireless channels or other channels within a local area network setting selected but which may occupy nearby, both physically and in frequency, wireless link channels.

Various software modules comprising program instructions 124 may be coordinated by an OS via an application programming interface (API). Examples of OSs may include WINDOWS, ANDROID, and other OS types known in the art. Examples of APIs include, but are not limited to: Win 32, Core Java API, or Android APIs. In a further example, processor 102 may conduct monitoring and processing of wireless communication device usage trends by IHS 100.

In a networked deployment, IHS 100 may operate in the capacity of a server or as a client user computer in a server-client user network environment, or as a peer computer system in a peer-to-peer (or distributed) network environment. IHS 100 may also be implemented as or incorporated into various devices, such as a personal computer (PC), a tablet PC, a set-top box (STB), a PDA, a mobile IHS, a palmtop computer, a laptop computer, a desktop computer, a communications device, a wireless telephone, a land-line telephone, a control system, a camera, a scanner, a facsimile machine, a printer, a pager, a personal trusted device, a web appliance, an access point, a network router, switch or bridge, or any other machine capable of executing a set of instructions (sequential or otherwise) that specifies actions to be taken by that machine.

Disk drive unit 116 may include a computer-readable medium 122 in which one or more sets of instructions 124 such as software can be embedded. Similarly, main memory 104 and static memory 106 may also contain computer-readable medium for storage of one or more sets of instructions, parameters, or profiles 124. Disk drive unit 116 and static memory 106 also contain space for data storage. Further, instructions 124 may embody one or more of the methods or logic as described herein.

Wireless link quality or conditions may be monitored and measured by processor 102 during wireless link usage and stored. In a particular embodiment, instructions, parameters, and profiles 124 may reside completely, or at least partially, within main memory 104, static memory 106, and/or disk drive 116 during execution by processor 102. Main memory 104 and processor 102 may also include computer-readable media. Battery 114 may include a smart battery system that tracks and provides power state data 126. This power state data may be stored with instructions, parameters, and profiles 124.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Wireless adapter 120 may include one or more radio frequency (RF) subsystems 130 with transmitter/receiver circuitry, wireless controller circuitry, amplifiers and other circuitry for wireless communications. Each RF subsystem 130 may communicate with one or more wireless technology protocols. RF subsystem 130 may contain individual subscriber identity module (SIM) profiles for each technology service provider and their available protocols. Alternatively, it may have a software-based SIM profile that is reconfigurable, or an eSIM for electronic control over activate SIM profile being used. Wireless adapter 120 may also include antenna system 132 which may include tunable antenna systems.

In some cases, wireless adapter 120 may operate two or more wireless communication links. For example, wireless adapter 120 may operate the two or more wireless communication links with a single, shared communication frequency band such as with the 5G standard relating to unlicensed wireless spectrum for small cell 5G next gen operation or for unlicensed WiFi WLAN operation. For instance, a 5 GHz wireless communication frequency band may be apportioned under the 5G standards for communication on either small cell WWAN wireless link operation or WiFi WLAN operation. In another example, wireless adapter 120 may operate a wireless communication link or links in unlicensed spectrum in 4.5G using protocols such as Licensed Assisted Access (LAA) or enhanced LAA (eLAA). In some embodiments, shared or aggregated wireless communication link(s) may be transmitted through one or a plurality of antennas.

In other cases, IHS 100 operating as a wireless communication device may operate a plurality of wireless adapters 120 for concurrent radio operation in one or more wireless communication bands. The plurality of wireless adapters 120 may further share a wireless communication band in some disclosed embodiments.

Wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. Wireless adapter 120 may connect to any combination of macro-cellular wireless connections including 2G, 2.5G, 3G, 4G, 5G or the like from one or more service providers. Wireless adapter 120 may represent an add-in card, wireless network interface module that is integrated with a main board of HIS 100 or integrated with another wireless network interface capability, or any combination thereof.

In an embodiment, wireless adapter 120 may include one or more RF subsystems 130 including transmitters and wireless controllers for connecting via a multitude of wireless links. IHS 100 may have an antenna system transmitter 132 for 5G small cell WWAN, WiFi WLAN or WiGig connectivity and one or more additional antenna system transmitters 132 for macro-cellular communication. RF subsystems 130 include wireless controllers to manage authentication, connectivity, communications, power levels for transmission, buffering, error correction, baseband processing, and other functions of wireless adapter 120.

RF subsystems 130 of wireless adapter 120 may measure various metrics relating to wireless communication pursuant to operation of a context aware radio resource management system. For example, the wireless controller of RF subsystem 130 may manage detecting and measuring received signal strength levels, bit error rates, signal to noise ratios, latencies, packet loss, congestion, contention, jitter, and other metrics or indicators relating to signal quality and strength. In an embodiment, a wireless controller may manage one or more RF subsystems 130 within wireless adapter 120.

The wireless controller also manages transmission power levels which directly affect RF subsystem power consumption. To detect and measure power consumption by RF subsystem 130, RF subsystem 130 may implement current and voltage measurements of power.

The wireless network may have a wireless mesh architecture in accordance with mesh networks described by the wireless data communications standards or similar standards. Wireless adapter 120 may also connect to the external network via a WPAN, WLAN, WWAN or similar wireless switched Ethernet connection. The wireless data communication standards set forth protocols for communications and routing via access points, as well as protocols for a variety of other operations. Other operations may include handoff of client devices moving between nodes, self-organizing of routing operations, or self-healing architectures in case of interruption.

In accordance with various embodiments, a computer-readable medium may include instructions, parameters, and profiles 124 or it may receive and execute instructions, parameters, and profiles 124 responsive to a propagated signal; so that a device connected to network 128 can communicate voice, video, or data over the network 128. Further, program instructions 124 may be transmitted or received over the network 128 via the network interface device or wireless adapter 120.

IHS 100 includes one or more application programs 124, and Basic Input/Output System and firmware (BIOS/FW) code 124. BIOS/FW code 124 functions to initialize IHS 100 on power up, to launch an operating system, and to manage input and output interactions between the operating system and the other elements of IHS 100. In an embodiment, BIOS/FW code 124 reside in memory 104, and include machine-executable code that is executed by processor 102 to perform various operations of IHS 100. In another embodiment, application programs and BIOS/FW code reside in another storage medium of IHS 100. For example, application programs and BIOS/FW code can reside in drive 116, in a ROM associated with IHS 100, in an option-ROM associated with various devices of IHS 100, in storage system 107, in a storage system associated with network channel of a wireless adapter 120, in another storage medium of IHS 100, or a combination thereof. Application programs 124 and BIOS/FW code 124 can each be implemented as single programs, or as separate programs carrying out the various operations described herein.

In some embodiments, a computer-readable medium may include a solid-state memory such as a memory card or other package that houses one or more non-volatile read-only memories. Further, a computer-readable medium may be a random-access memory or other volatile re-writable memory. Additionally, a computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment.

Sensors 118 may be disposed within IHS 100, and/or display 110, and/or a hinge coupling a display portion to a keyboard portion of IHS 100, and may include, but are not limited to: electric, magnetic, hall effect, radio, optical, infrared, thermal, force, pressure, touch, acoustic, ultrasonic, proximity, position, angle, deformation, bending, direction, movement, velocity, rotation, acceleration, bag state (in or out of a bag), and/or lid sensor(s) (open or closed). In some cases, one or more sensors 118 may be a part of a keyboard or other input device 112. Processor 102 may be configured to process information received from sensors 118 and to perform context-based predictive scanning and handover operations.

For instance, during operation, the user may open, close, flip, swivel, or rotate display 110 to produce different IHS postures. In some cases, processor 102 may be configured to determine a current posture of IHS 100 using sensors 118. For example, in a dual-display IHS implementation, when a first display 110 (in a first IHS portion) is folded against a second display 110 (in a second IHS portion) so that the two displays have their backs against each other, IHS 100 may be said to have assumed a book posture. Other postures may include a table posture, a display posture, a laptop posture, a stand posture, or a tent posture, depending upon whether IHS 100 is stationary, moving, horizontal, resting at a different angle, and/or its orientation (landscape vs. portrait). For each posture and/or hinge angle, processor(s) 201 may perform a different context-based predictive scanning and handover operation.

For example, in a laptop posture, a first display surface of a first display 110 may be facing the user at an obtuse angle with respect to a second display surface of a second display 110 or a physical keyboard portion. In a tablet posture, a first display 110 may be at a straight angle with respect to a second display 110 or a physical keyboard portion. And, in a book posture, a first display 110 may have its back resting against the back of a second display 110 or a physical keyboard portion.

It should be noted that the aforementioned postures, and their various respective keyboard states, are described for sake of illustration. In different embodiments, other postures may be used, for example, depending upon the type of hinge coupling the displays, the number of displays used, or other accessories.

Moreover, a different predictive scanning and handover operation may be performed based on other context information such as the presence or distance of the user with respect to IHS 100 and/or display 110. In these cases, processor 102 may process user presence data received by sensors 118 and may determine, for example, whether an IHS's end-user is present or absent.

In situations where the end-user is present before IHS 100, processor 102 may further determine a distance of the end-user from IHS 100 continuously or at pre-determined time intervals. The detected or calculated distances may be used by processor 102 to classify the user as being in the IHS's near-field (user's position<threshold distance A), mid-field (threshold distance A<user's position<threshold distance B, where B>A), or far-field (user's position>threshold distance C, where C>B) with respect to IHS 100 and/or display 110.

More generally, in various implementations, processor 102 may receive IHS context information using sensors 118 including one or more of, for example: user's presence state (e.g., present, near-field, mid-field, far-field, absent), IHS location (e.g., based on the location of a wireless access point or Global Positioning System), IHS movement (e.g., from an accelerometer or gyroscopic sensor), lid state (e.g., of a laptop), hinge angle (e.g., in degrees), IHS posture (e.g., laptop, tablet, book, tent, and display), whether the IHS is coupled to a dock or docking station, a distance between the user and at least one of: the IHS, the keyboard, or a display coupled to the IHS, a type of keyboard (e.g., a physical keyboard integrated into IHS 100, a physical keyboard external to IHS 100, or an on-screen keyboard), whether the user is operating the keyboard is typing with one or two hands (e.g., holding a stylus, or the like), a time of day, software application(s) under execution in focus for receiving keyboard input, etc.

In various embodiments, IHS 100 may not include all of the components shown in FIG. 1. Additionally, or alternatively, IHS 100 may include components in addition to those shown in FIG. 1. Additionally, or alternatively, components represented as discrete in FIG. 1 may be integrated with other components. For example, all or a portion of the functionality provided by the illustrated components may be implemented in a System-On-Chip (SOC), or the like.

Figure 2:
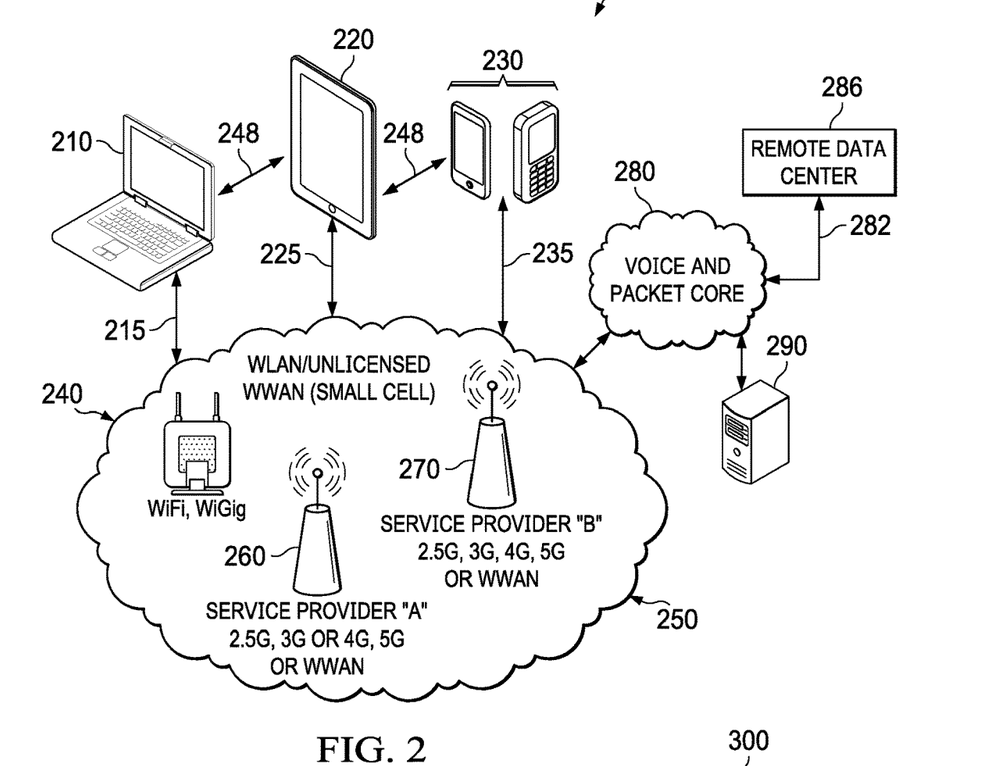
FIG. 2 is block diagram of a network environment where systems and methods for predictive scanning and handover may be implemented, according to some embodiments.

FIG. 2 is block diagram of a network environment where systems and methods for predictive scanning and handover may be implemented. In some embodiments, network 200 may include networked wireless communication devices 210, 220, and 230, wireless network access points, and multiple wireless connection link options. Network 200 may include one or more wired communication devices or links. For example, communication device 210 may include a wired link, such as an Ethernet link. A variety of additional computing resources of network 200 may include client mobile information handling systems, data processing servers 290, network storage devices, local and wide area networks, or other resources as needed or desired.

As depicted, IHSs 210, 220, and 230 may be a laptop computer, tablet computer, or smartphone device. Wireless communication devices 210, 220, and 230 may access a wireless local network 240, or they may access a macro-cellular network 250. In a further example, IHS 230, such as a laptop, may alternatively access local network 240 using a wired link, such as a wired Ethernet connection. In an example, the wireless local network 240 may be the wireless local area network (WLAN), a wireless personal area network (WPAN), or a wireless wide area network (WWAN).

In an embodiment, a standalone mobile IHS 210, 220, or 230 may operate on WLAN such as WiFi or on unlicensed WWAN small cell wireless links such as with small cell unlicensed LTE substations in wireless local network 240. Components of a WLAN may be connected by wireline or Ethernet connections to a wider external network. For example, wireless network access points may be connected to a wireless network controller and an Ethernet switch. Wireless communications across wireless local area network 240 may be via standard protocols such as IEEE 802.11 WiFi, IEEE 802.11ad WiGig, IEEE 802.15 WPAN, or emerging 5G small cell WWAN communications such as eNodeB, or similar wireless network protocols.

Alternatively, other available wireless links within network 200 may include macro-cellular connections 250 via one or more service providers 260 and 270. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including small cell WWAN, WiMAX, LTE, and LTE Advanced, LTE-LAA, and the like.

In some embodiments, networked wireless communication devices 210, 220, or 230 may have a plurality of wireless network interface systems capable of transmitting simultaneously within a shared communication frequency band. Communication within a shared communication frequency band may be sourced from different protocols on parallel wireless network interface systems or from a single wireless network interface system capable of transmitting and receiving from multiple protocols. Similarly, a single antenna or plural antennas may be used on each of the wireless communication devices. Examples of competing protocols may be local wireless network access protocols such as WiFi, WiGig, and small cell WLAN in an unlicensed, shared communication frequency band. Examples of communication frequency bands may include unlicensed 5 GHz frequency bands or 2.5 GHz conditional shared communication frequency bands under FCC Part 96. WiFi ISM frequency bands that could be subject to future sharing include 2.4 GHz, 60 GHz, 900 MHz or similar bands.

Voice and packet core network 280 may contain externally accessible computing resources and connect to a remote data center 286. Voice and packet core network 280 may contain multiple intermediate web servers or other locations with accessible data. Voice and packet core network 280 may also connect to other wireless networks similar to 240 or 250 and additional wireless communication devices such as 210, 220, 230 or similar connected to those additional wireless networks.

Connection 282 between wireless network 240 and remote data center 286 or connection to other additional wireless networks may be via Ethernet or another similar connection to the world-wide-web, a WAN, a LAN, another WLAN, or other network structure. Connection 282 may be made via a WLAN access point/Ethernet switch to the external network and be a backhaul connection.

The access point may be connected to one or more wireless access points in the WLAN before connecting directly to a wireless communication device or may connect directly to one or more wireless communication devices 210, 220, and 230. Alternatively, wireless communication devices 210, 220, and 230 may connect to the external network via base station locations at service providers such as 260 and 270. These service provider locations may be network connected via backhaul connectivity through the voice and packet core network 280.

Remote data center 286 may include web servers or resources within a cloud environment. For example, remote data centers can include additional information handling systems, data processing servers, network storage devices, local and wide area networks, or other resources as needed or desired. Having such remote capabilities may permit fewer resources to be maintained at the wireless communication devices 210, 220, and 230 allowing streamlining and efficiency within those devices. Similarly, remote data center 286 permits fewer resources to be maintained in other parts of network 200.

In various implementations, cloud or remote data center 286 or networked server 290 may run hosted applications for systems 210, 220, and 230. For example, remote data center 286, networked server 290, or some combination of both may operate some or all of a plurality of hosted applications. Wireless communication devices 210, 220, and 230 may be configured to run one or more applications locally, and to have hosted applications run in association with the local applications at remote data center 286 or networked server 290. For example, wireless communication devices 210, 220, and 230 may operate some or all of the hosted applications on a remote server via local area network connectivity using a link aggregation system among the plurality of local area networks in some embodiments.

Thus, as illustrated, systems 210, 220, and 230 may be running applications locally while requesting data objects related to those applications from the remote data center 286 via a wireless network. For example, a data storage client application such as Microsoft Sharepoint may run on system 220, and it may be associated with a host application running at remote data center 286 that represents a Sharepoint data storage server. In another example, a web browser application may be operating at system 230, and it may request web data from a host application that represents a hosted website and associated applications running at remote data center 286.

Although 215, 225, and 235 are shown connecting wireless adapters of wireless communication devices 210, 220, and 230 to wireless networks 240 or 250, actual wireless communication may link through a wireless access point (WiFi or WiGig), through unlicensed WWAN small cell base stations such as in network 240 or through a service provider tower such as that shown with service provider A 260 or service provider B 270 and in network 250.

In other cases, wireless communication devices 210, 220, and 230 may communicate intra-device via 248 when one or more of wireless communication devices 210, 220, and 230 are set to act as an access point or a WWAN connection via small cell communication or licensed small cell WWAN connections. For example, one of wireless communication devices 210, 220, and 230 may serve as a WiFi hotspot.

Quality-of-Service (QoS), bandwidth, time-of-flight (e.g., following the Fine Time Measurement or "FTM" protocol), and/or speed of wireless links 215, 225, and 235—that is, a link's capabilities—may vary widely depending on several factors including the service provider, the number of wireless communication devices and users in a location, and other factors. Thus, selection of a wireless link among local area network links such as WLAN links may depend on assessment of the link radio frequency conditions. The wireless communication device's operating context can play an important role in determining wireless link conditions. Information about wireless link connection quality and capacity for a service to be used can be advantageous in optimizing predictive scanning and handover.

Often the QoS of an end-to-end wireless communication path between wireless communication devices of a user and a recipient will most directly be affected the QoS levels at the end stages of the wireless communication path. For example, the wireless link QoS between a user wireless communication device and the wireless network on one end and the wireless link QoS between a recipient wireless communication device on the other end are often the places where communication path quality compromise, capacity limitation, or latency is most likely to occur.

Factors impacting energy consumption include switching and signaling during communication access, setup, and authentication. Additional factors that impact energy consumption include control communications, latencies, transmission/reception, and switching for the wireless link. These factors can be specific to the type of wireless service being requested, whether voice, messaging, SMTP, Audio, Video, HTTP or other service types. They can also be specific to the wireless communication device used. In each instance, radio frequency transmission subsystems and controllers operate and consume device power. Based on these, and other factors, systems and methods described herein may automatically select among communication links and/or aggregated communication links to optimize radio frequency conditions, traffic conditions, device power consumption, cost, etc.

Figure 3:
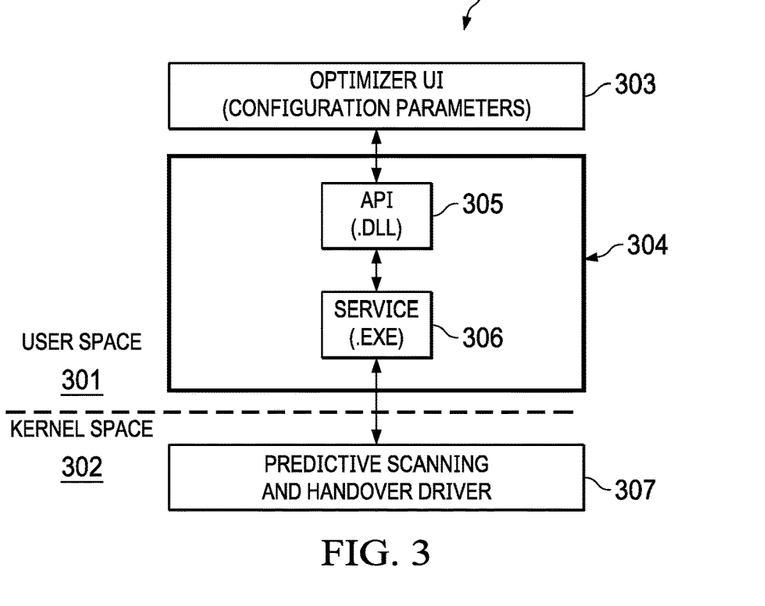
FIG. 3 is a block diagram of software modules configured to implement predictive scanning and handover, according to some embodiments.

FIG. 3 is a block diagram of software modules 300 configured to implement predictive scanning and handover. In some embodiments, software 300 may be instantiated through the execution of program instructions 124 by processor 102 of IHS 100 and configured execute method 500 shown in FIG. 5. As shown, optimizer user interface (UI) 303 may provide a graphical UI (GUI) in user space 301 configured to receive one or more configuration parameters. For example, optimizer UI 303 may receive, as configuration parameters, a user's selection of QoS indicator(s), threshold(s), and/or context information (e.g., application type, proximity-based, posture-based, etc.), usable by software 300 to determine when to enable, disable, and/or (re)configure predictive scanning and handover features in IHS 100.

Optimizer UI passes configuration parameters to OS plug-in module 304, which includes API 305 (a dynamic-link library or DLL, etc.) and OS service 306 (e.g., an executable). In some implementations, OS service 306 may be configured to handle predictive scanning and handover operations in user space 301. In kernel space 302, callout driver 307 (e.g., Windows Filtering Platform (WFP)) may be configured to perform predictive scanning and handover operations under control of OS service 306, according to the configuration parameters received via optimizer UI 303.

In some implementations, software 300 may include machine learning (ML) and/or artificial intelligence (AI) algorithms configured to collect context information such as, for example, RSSI from various APs, ToF from various APs, physical location information (e.g., by GPS) to create a map of wireless fingerprints that indicate dead and/or live zones for each AP based on selected threshold values. Software 300 may also include ML and/or AI algorithms configured to store and analyze other context information indicative of user behavior, such as IHS motion information (e.g., position, velocity, and acceleration), applications under execution and their priorities, distance between the user and the IHS, IHS posture or hinge angle, bag status, etc. Moreover, software 300 may be configured to use such information to select different distances and/or times to/from dead and live zones that are specific to that context when performing predictive scanning and handover operations.

Figure 4A:
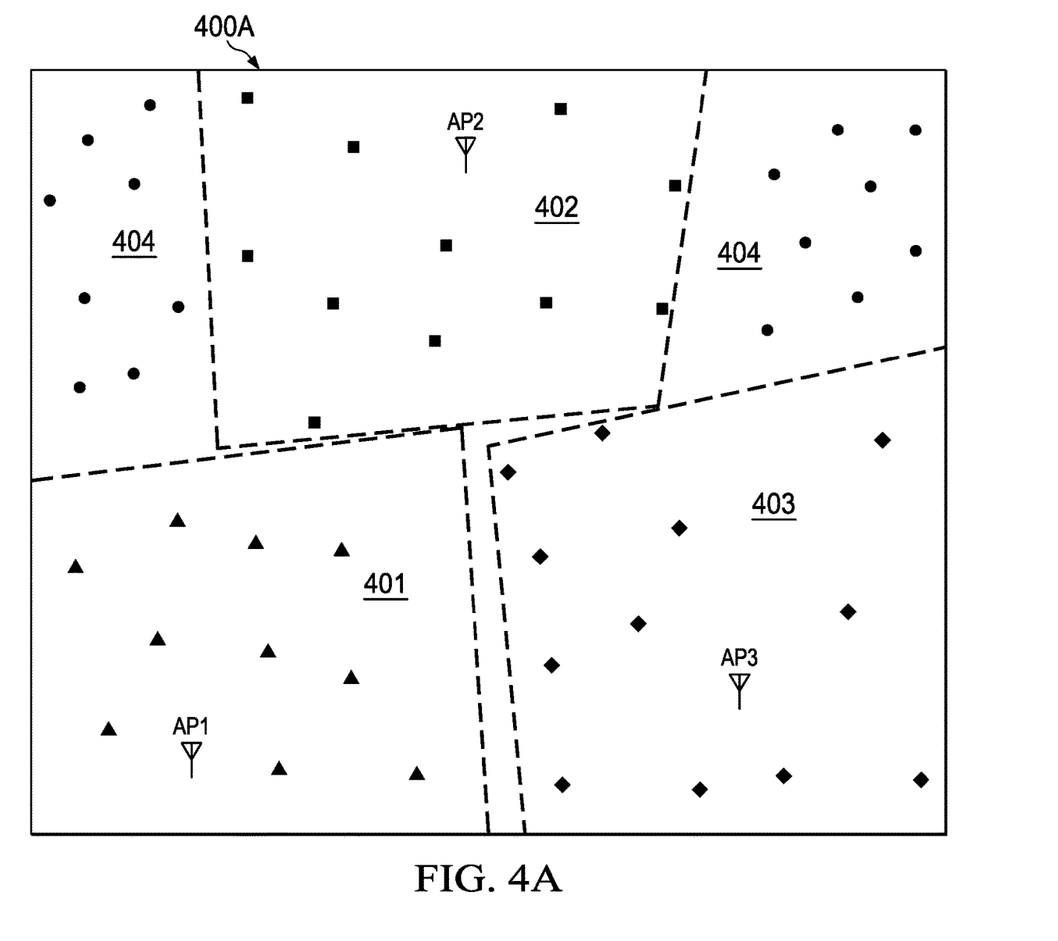
FIGS. 4A and 4B are diagrams of a use-case example, according to some embodiments.
Figure 4B:
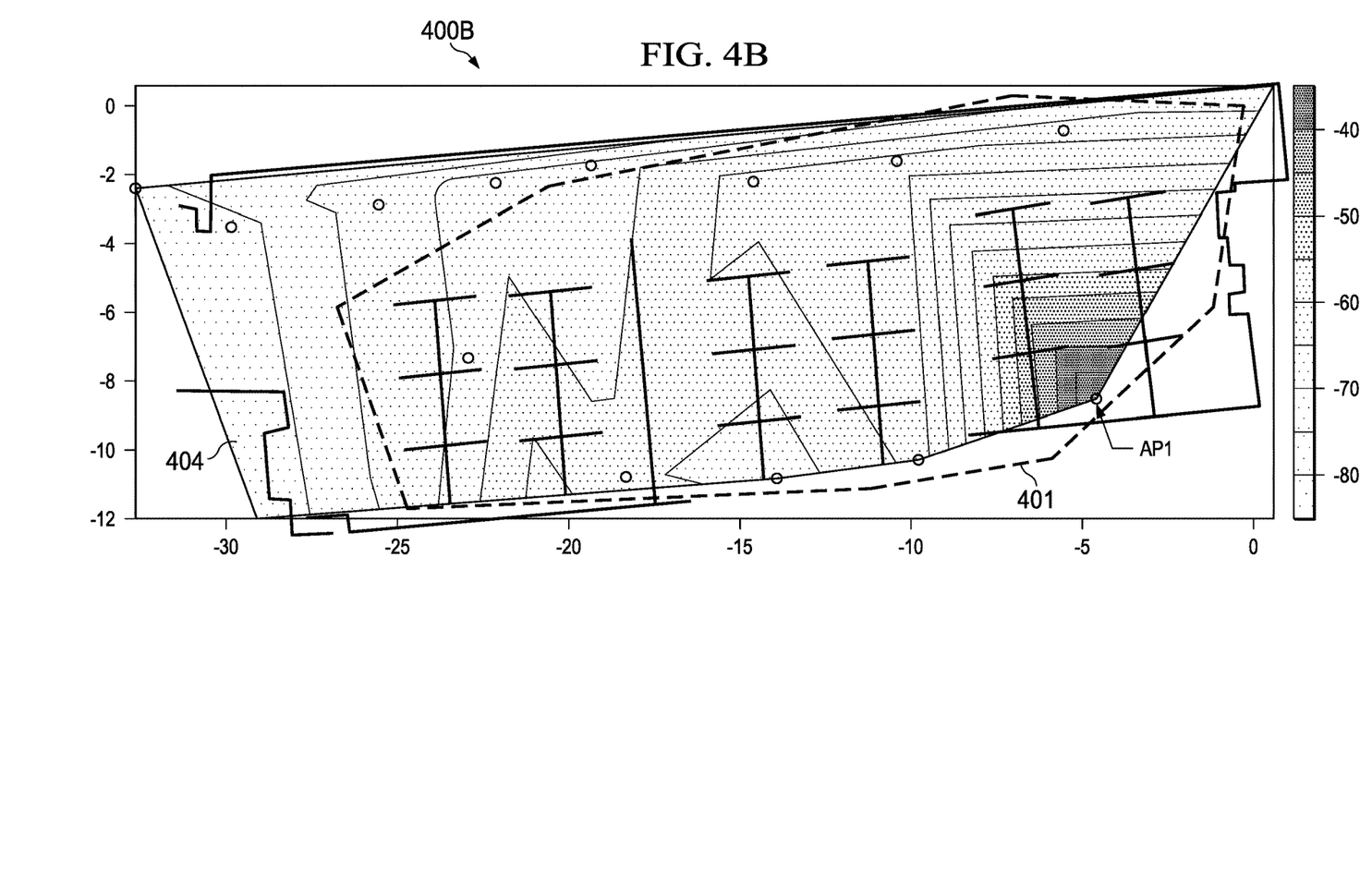

FIGS. 4A and 4B are diagrams of a use-case example. In this embodiment, software modules 300, upon execution by IHS 100 operating within network 200, may produce map 400 of an example of a building with three access points (APs). Specifically, AP1 produces first live zone 401, AP2 produces second live zone 402, and AP3 produces third live zone 403. Areas 404 are dead zones. The boundaries between various zones may be set in terms of RSSI and/or ToF indicators (i.e., wireless fingerprints) collected as the IHS moves around map 400, over time, using threshold values for these parameters as necessary to maintain a suitable connection between IHS 100 and a given AP.

A conventional IHS is unaware of map 400 and collects WiFi beacon information at regular time internals (e.g., 10 seconds) from an AP that the IHS is connected to. When a conventional IHS detects a WiFi connectivity loss, for instance, as the user moves from live zone 401 to dead zone 404, the IHS performs active and/or passive WiFi scan operations for another period of time (e.g., 3.5 seconds) before it can initiate a cellular network attach operation, which takes even more time.

In contrast, using systems and methods described herein, software 300 may be made aware of map 400 and may be configured to perform network or AP switching and handover operations predictively, prior to IHS 100 losing its original connection. The distance and/or time from a dead zone or live zone boundary at which certain switching and handover operations begin (e.g., scanning) may depend upon the user's motion, context, and/or historical behavior information.

Still in reference to FIG. 4A, based on user data and previous connectivity data, clusters may be generated defining the best connectivity region(s) 401-403 of all previously connected APs. The same process may also be used to identify a cluster with WiFi dead zone(s) 404. Dead zone(s) 404 may be defined either for cellular connectivity or WiFi dead (weak WiFi signaled) zones.

Clustering may be performed by user data based on RSSI and/or TOF to segregate each AP connectivity region 401-403. Other clusters where the signal strength of all APs drop or fade may be segregated as a WiFi dead zone(s) 404. In some cases, clustering may be performed on the basis of signal strength levels rather than AP-based using unsupervised learning.

FIG. 4B shows a subsection of map 400 with AP1, live zone 401, and dead zone 404. In some cases, live zone 401 may set a handover boundary of map 400 such that, when RSSI indicators drop below −80 dBM and/or ToF is longer than 15 ns, software 300 triggers scanning a of a second wireless connection in response to motion and/or other context information.

In some cases, the threshold values used to determine whether or not to begin the second scan—e.g., if the current RSSI indicator drops to −80 dBm, if the current distance from dead zone 404 is smaller than 10 m, and/or if the time to reach the boundary is 10 seconds or less—may be altered depending upon the motion and/or context information, for example, using multipliers or weights corresponding different pieces of motion/context information.

In various implementations, context and motion information may be collected as the user moves around various APs, and it may be recorded over time as historical behavioral information. Supervised ML and/or AI algorithms may be used to predict a user's potential entry to dead zone(s) 404 based on their previous behavior (e.g., position, velocity, acceleration, application(s) under execution, IHS posture, bag status, etc.).

Figure 5:
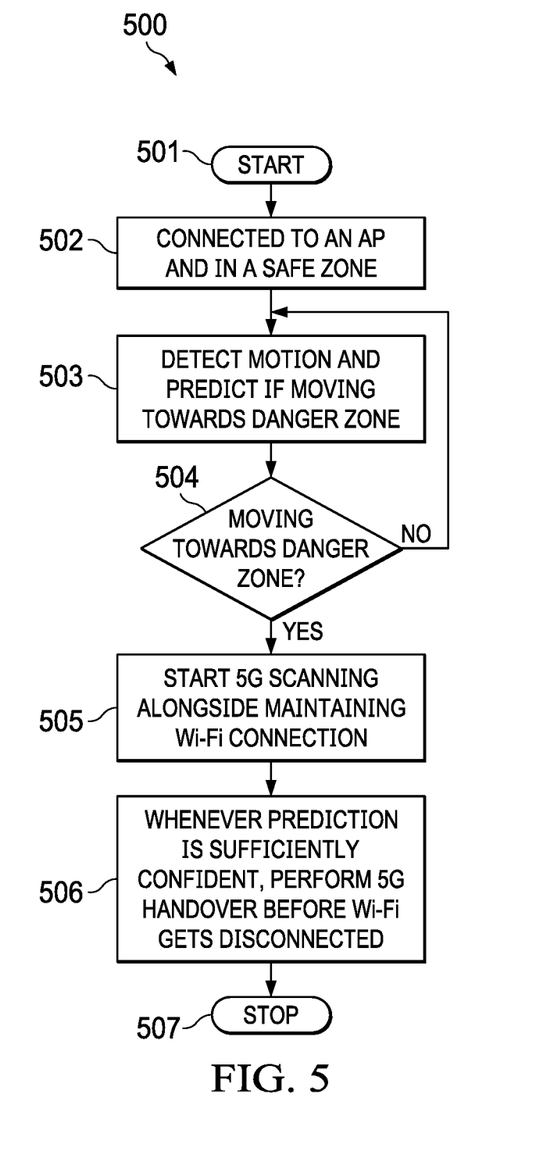
FIG. 5 is a flowchart of an example of a method for predictive scanning and handover, according to some embodiments.

FIG. 5 is a flowchart of an example of method 500 for predictive scanning and handover. In some embodiments, method 500 may be performed by IHS 100 in response to program instructions 124 being executed by processor 102. In this example, method 500 provides a procedure for handing over from WiFi to cellular with minimal handover time.

Generally speaking, the WiFi/cellular scanning algorithm does not need to be altered; rather map 400 and context information may be used to reduce switching time by scanning sooner, prior to IHS 100 losing its present wireless connection. In some embodiments, method 500 may be implemented as an OS service or as driver firmware in ISH or EC, and it may be configured to handle predict the need for handover and switching when IHS 100 is in modern standby state(s).

Method 500 starts at block 501. At block 502, method 500 determines that IHS 100 is connected to an AP (e.g., AP1) and is currently in a safe or live zone (e.g., zone 401). At block 503, method detects motion and/or context information and predicts if IHS 100 is moving toward a danger or dead zone (e.g., zone 404). Based on previous behaviors and current motion, a pattern is derived and future location of IHS 100 predicted with a confidence percentage.

To determine that IHS 100 is moving toward dead zone 404, method 500 may cause IHS 100 to compare a current behavior of a user of the IHS with a historical behavior of the user. In some cases, to predict the loss of a first wireless connection, block 503 may determine that IHS 100 is within a threshold distance or time from dead zone 404 based upon the comparison.

For example, the context information may include an application under execution, and the threshold distance or time may be selected as a first threshold distance or time in response to the application being a first application or a second threshold distance or time in response to the application being a second application. For instance, in response to the application having a higher priority (e.g., a video or audio conference application), handover procedures may be performed sooner than when the application has a lower priority (e.g., a video streaming application).

Additionally, or alternatively, the context information may include a posture of IHS 100, and the threshold distance or time may be selected as a first threshold distance or time in response to the IHS posture being a first posture or a second threshold distance or time in response to the IHS posture being a second posture. For example, in response to IHS 100 being in a posture such that a primary display's back is facing the back of a secondary display (or a keyboard portion), as opposed IHS 100 being is a closed clamshell configuration (where the primary display's screen is facing the keyboard portion of IHS 100), handover procedures may be performed sooner.

Additionally, or alternatively, the context information may include an indication of whether IHS 100 is inside or outside of a bag, and the threshold distance or time may be selected as a first threshold distance or time in response to the IHS being inside the bag or a second threshold distance or time in response to the IHS being outside the bag. For example, in response to IHS 100 being carried outside of a bag, handover procedures may be performed sooner than otherwise. All context information may be combined in any suitable way to create a pattern of historical behavior and/or to make scanning decisions.

If block 504 determines, using the motion and/or context information, that the user is not moving toward dead zone 404, control returns to block 503. Conversely, if block 504 determines, using the motion and/or context information, that the user is moving toward dead zone 404, block 505 starts scanning for a cellular connection while maintaining the WiFi connection. At block 506, a confidence parameter may be deduced from the prediction algorithms (e.g., ML or AI) that numerically gives the probability of IHS 100 eventually ending up in dead zone 404. Still at block 506, whenever the confidence parameter reaches a selected threshold level, method 500 may perform a cellular handover operation before WiFi gets disconnected. Method 500 ends at block 507.

In some cases, Wi-Fi scanning may be performed with a defined (or adjusted) time interval and occurring frequency either while IHS 100 is connected to a cellular base station or a WiFi AP. For instance, WiFi scanning may be performed to find out ToF/RSSI value for each available WiFi AP, including the current AP and other nearby WiFi APs. WiFi scanning results may be stored during a defined storing interval (e.g., only the very previous results or more) for a contingency plan in case of danger zone (current connection is in danger) or dead zone (neither cellular nor WiFi).

With respect to cellular scanning, the scanning across multiple cellular base stations to yield a recommendation of best cellular base station among nearby cellular base stations may be performed by the cellular network itself, such that the connection to that cellular base station may be automatically configured by cellular network. In other cases, however, IHS 100 may also track link quality data (e.g., ToF and RSSI values) for each cellular base station nearby, measured by IHS 100 and/or reported by a base station.

In the opposite direction, as the user is moving from dead zone 404 to live zone 401, the process of method 500 may be performed in reverse. Particularly, method 500 may receive additional information (e.g., additional motion and/or other context data), predict the detection of the first wireless connection based upon the additional information and, in response to the prediction, it may start to scan for the first wireless connection (e.g., a WiFi connection with AP1) while maintaining the second wireless connection (cellular with a nearby base station), and then it may switch to the first wireless connection prior to dropping the second wireless connection.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution, cause the IHS to:
receive context information comprising at least one of an IHS posture, a bag state, and user presence information;
predict a loss of a first wireless connection based upon a first threshold distance or time associated with a first instance of the context information or a second threshold distance or time associated with a second instance of the context information, wherein the first instance is different than the second instance, and wherein the first threshold distance or time is different than the second threshold distance or time;
in response to the prediction, start scanning for a second wireless connection while maintaining the first wireless connection; and
switch to the second wireless connection prior to losing the first wireless connection.

2. The IHS of claim 1, wherein the IHS comprises at least one of a mobile device, a laptop computer, or a tablet computer.

3. The IHS of claim 1, wherein the first wireless connection comprises a WiFi connection, and wherein the second wireless connection comprises a cellular connection.

4. The IHS of claim 1, wherein the context information comprises a Received Signal Strength Indicator (RSSI) indication.

5. The IHS of claim 1, wherein the context information comprises a Time-of-Flight (ToF) indication.

6. The IHS of claim 1, wherein to predict the loss, the program instructions, upon execution, further cause the IHS to determine that the IHS is moving toward a dead zone with respect to the first wireless connection using the context information.

7. The IHS of claim 6, wherein to determine that the IHS is moving toward the dead zone, the program instructions, upon execution, further cause the IHS to compare a current behavior of a user of the IHS with a historical behavior of the user.

8. The IHS of claim 1, wherein the IHS posture comprises at least one of a tablet posture, a laptop posture, a book posture, a tent posture, a display posture, or a closed posture.

9. The IHS of claim 1, wherein the program instructions, upon execution, further cause the IHS to predict the loss of the first wireless connection based upon a third threshold distance or time associated with a third instance of the context information, wherein the third instance is different than the first and second instance, and wherein the third threshold distance or time is different than the first and second threshold distance or time.

10. The IHS of claim 9, wherein the context information comprises the presence information, and wherein the first threshold distance comprises a near-field distance, the second threshold distance comprises a mid-field distance, and the third threshold distance comprises a far-field distance.

11. The IHS of claim 1, wherein the bag state comprises an indication of whether the IHS is inside or outside of a bag, and wherein the first threshold distance or time is associated with the IHS being inside the bag, and the second threshold distance or time is associated with the IHS being outside the bag.

12. The IHS of claim 1, wherein the program instructions, upon execution, further cause the IHS to:
receive additional context information;
predict a detection of the first wireless connection based upon the additional context information;
in response to the prediction, start to scan for the first wireless connection while maintaining the second wireless connection; and
switch to the first wireless connection prior to dropping the second wireless connection.

13. The IHS of claim 12, wherein to predict the detection of the first wireless connection, the program instructions, upon execution, further cause the IHS to determine that the IHS is moving toward a live zone with respect to the first wireless connection using the additional context information.

14. The IHS of claim 13, wherein to determine that the IHS is moving toward the live zone, the program instructions, upon execution, further cause the IHS to compare the current behavior of a user of the IHS with the historical behavior of the user.

15. The IHS of claim 12, wherein to predict the detection of the first wireless connection, the program instructions, upon execution, further cause the IHS to determine that the IHS is within another threshold distance or time from the live zone based upon the comparison.

16. The IHS of claim 15, wherein the program instructions, upon execution, further cause the IHS to predict the detection of the first wireless connection based upon the other threshold distance or time.

17. The IHS of claim 16, wherein the additional context information comprises the presence information, and wherein the other threshold distance comprises at least one of a near-field distance, a mid-field distance, and a far-field distance.

18. The IHS of claim 16, wherein the bag state comprises an indication of whether the IHS is inside or outside of a bag, and wherein the other threshold distance or time is associated with whether the IHS is inside or outside the bag.

19. A memory device having program instructions stored thereon that, upon execution by an Information Handling System (IHS), cause the IHS to:
receive context information comprising at least one of an IHS posture, a bag state, and user presence information;
predict a loss of a first wireless connection based upon a first threshold distance or time associated with a first instance of the context information or a second threshold distance or time associated with a second instance of the context information, wherein the first instance is different than the second instance, and wherein the first threshold distance or time is different than the second threshold distance or time; and
in response to the prediction, start to scan for a second wireless connection.

20. A method, comprising:
receiving context information comprising at least one of an IHS posture, a bag state, and user presence information;
predicting a loss of a first wireless connection based upon a first threshold distance or time associated with a first instance of the context information or a second threshold distance or time associated with a second instance of the context information, wherein the first instance is different than the second instance, and wherein the first threshold distance or time is different than the second threshold distance or time; and
in response to the prediction, starting to scan for a second wireless connection.

* * * * *